United States Patent [19]

Janusch et al.

[11] Patent Number: 4,673,510

[45] Date of Patent: Jun. 16, 1987

[54] PROCESS FOR THE DISPOSAL OF SETTLED SLUDGE DERIVED FROM A BIOLOGICAL SEWAGE-DISPOSAL PLANT

[75] Inventors: Alois Janusch, Kindberg-Aumühl; Walter Lugscheider, Linz; Fritz Ludewig, Leoben, all of Austria

[73] Assignee: Voest-Alpine Aktiengesellschaaft, Vienna, Austria

[21] Appl. No.: 807,026

[22] Filed: Dec. 9, 1985

[30] Foreign Application Priority Data

Dec. 17, 1984 [AT] Austria .............................. A 4000/84

[51] Int. Cl.⁴ ............................................ B01D 45/14
[52] U.S. Cl. .................................. 210/712; 210/724; 210/737; 210/751; 210/774; 210/787
[58] Field of Search .............. 210/774, 787, 788, 789, 210/749, 751, 702, 766, 723, 724, 737, 712

[56] References Cited

FOREIGN PATENT DOCUMENTS 119987 10/1985 European Pat. Off. .

Primary Examiner—Frank Sever
Attorney, Agent, or Firm—Cushman, Darby & Cushman

[57] ABSTRACT

In a process for the disposal of settled sludge derived from a biological sewage-disposal plant, in which the thickened sludge is further dewatered and at least partially thermally decomposed within a centrifuge (15) by using separated steam, preferably at a pressure within the range of 1 to 15 bar and at a temperature of 100° C. to 200° C., the centrifugate of the centrifuge (15) subjected to the action of saturated steam is discharged via a lock (18) and is immediately subsequently subjected to a sulfidic precipitation (19) of heavy metals. The solid matter separated within the centrifuge (15) is simultaneously discharged via locks (28) and optionally is subjected to a post-drying step (33) and at least partially to a combustion, for example a fluidized bed combustion (23), for steam production (17) for the centrifuge (15), noting that the steam is completely circulated along a closed circuit and the waste steam of the locks is used for air-heating (30), whereupon condensate formed is supplied to the pre-settling basin (5) of the sewage-disposal plant, whereby the energy requirement is reduced and the environmental load is equally reduced.

11 Claims, 1 Drawing Figure

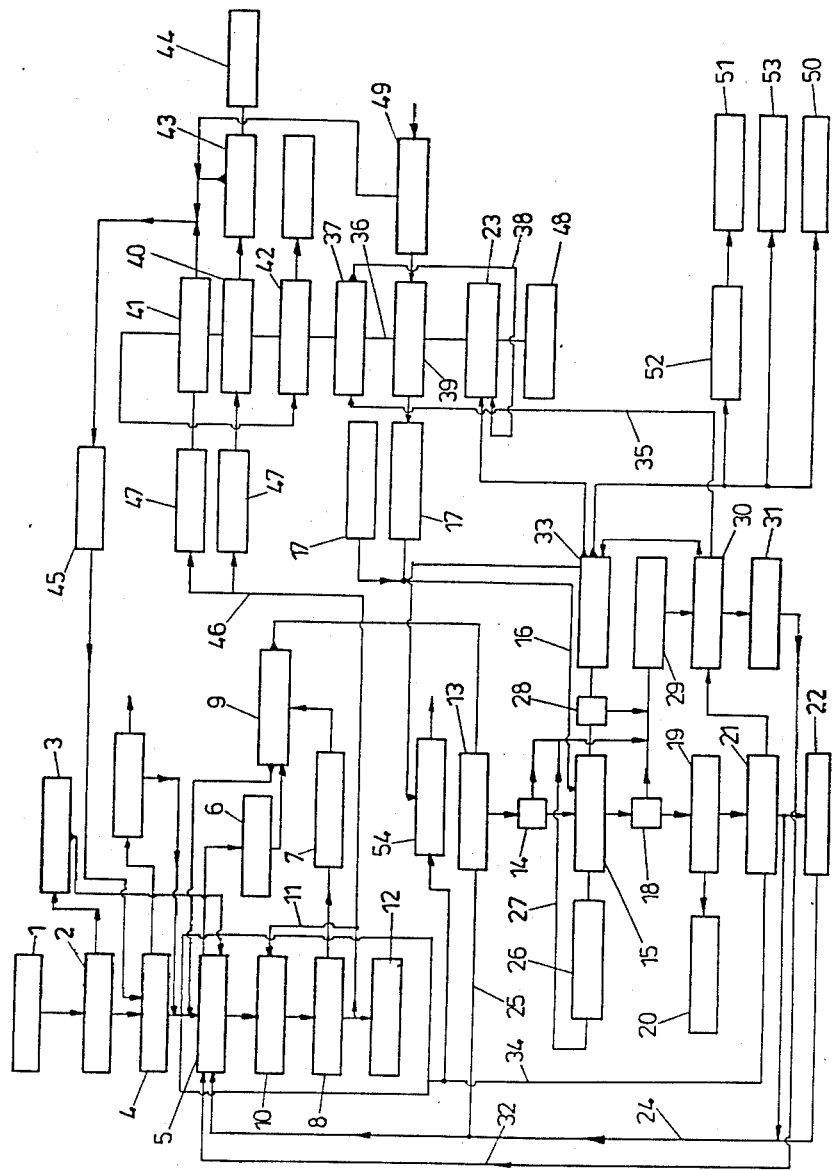

PROCESS FOR THE DISPOSAL OF SETTLED SLUDGE DERIVED FROM A BIOLOGICAL SEWAGE-DISPOSAL PLANT

BACKGROUND OF THE INVENTION

1. Field of the Invention

The invention refers to a process for the disposal of settled sludge derived from a biological sewage-disposal plant, in which process the thickened sludge is further dewatered and is at least partially thermically decomposed within a centrifuge by using saturated steam, preferably at a pressure within the range of 1 to 15 bar and at a temperature of 100° C. to 200° C. Such a process can, for example, be taken from European patent application No. 119 987. By using saturated steam simultaneously with a mechanical stress by centrifuging, not only the dewatering efficiency is substantially improved but also a number of chemical conversions are simultaneously taking place which result in an improvement of the product obtained. In particular, such a thermical conversion provides the possibility to eliminate noxious components in case of a combustion or in case of dumping and facilitates subsequent separation into individual process products of different utilizability.

2. Description of the Prior Art

The removal of settled sludge derived from mechanical-biological settling plants represents a world-wide problem. For example, in the Federal Republic of Germany, there are collected per year approximately $40.10^6$ m$^3$ settled sludge from municipal sewage settling plants and $20.10^6$ m$^3$ sewage sludge from industrial sewage settling plants. This settled sludge contains 3 to 5 percent dry matter mainly consisting of organic matter. The soil-improving and fertilizing action of this matter is utilized in agriculture. Utilization is, however, restricted by the heavy metals, such as lead, zinc, cadmium and others, as well as by pathogenic agents, such as bacteria, virusses, worm eggs and others, contained in the settled sludge. Furthermore, the yield in settled sludge is limited in dependence on the seasons. Further methods for sludge removal are depositing on land or dumping into the sea. The first mentioned method has as a premise a far-reaching dewatering of the sludge, which can only be obtained by adding substances, such as lime for example, reducing the water content, but which does not reliably prevent contamination of the phreatic water. The latter method can result in a contamination of fishing area. The most pronounced reduction of the volume of the sludge is obtained by a combustion or a pyrolysis, which up till now requires, however, the use of additional fuels resulting in increased operating costs.

SUMMARY OF THE INVENTION

The invention now aims at providing, based on the initially mentioned process for dewatering of sludges, a method for sludge removal which results in a further reduction of the amount of products not suitable for being immediately further processed, and this with an amount of foreign energy being as small as possible. For solving this task, the invention essentially consists in that the centrifugate of the centrifuge subjected to the action of saturated steam is discharged via a lock and is immediately subsequently subjected to a sulfidic precipitation of heavy metals and in that the solid matter separated within the centrifuge are discharged via locks and optionally are subjected to a post-drying step and at least partially to a combustion step, for example to a fluidized bed combustion, for producing steam for the centrifuge, noting that the steam is as a whole recycled within a closed circuit and the waste steam from the lock is utilized for heating air, whereupon the condensate formed is supplied to the preliminary settling basin of the sewage-disposal plant. On account of the centrifugate of the centrifuge subjected to the action of saturated steam being discharged via a lock and being immediately subsequently subjected to a sulfidic precipitation of heavy metals, the residual heat of the centrifugate is already utilized at this occasion. Precipitation of sulfides by means of sodium sulfide can be effected at 90° C. in a particularly rapid and substantially complete manner, noting that the formed sludge of heavy metals can, after having been extracted via the locks and after having been dewatered, be transported to a special depositing site or be further processed. On account of the solid matter discharged from the centrifuge via locks being, within the disposal system, at least partially subjected to a combustion, for which purpose can, for example, be performed a fluidized bed combustion, the energy required for the steam production can be supplied, noting that this steam is supplied to the centrifuge. On account of only part of the amount of steam produced during the combustion of the total amount of sludge being required for supplying the centrifuge, the major part can be utilized for external purposes (for example for the production of energy or heat, respectively). The steam within the system is completely recycled along a closed circuit, and a further reduction of the energy requirement can be obtained if the waste steam of the locks is utilized for heating air. The heated air can subsequently be used for further drying the product discharged from the centrifuge prior to subjecting this product to a combustion or be used for preheating air being, for example, used as combustion air. The condensate obtained from the condensate of the waste steam of the lock can, within the scope of the inventive combination of a biologic sewage treatment plant with the other equipment, be recycled to the pre-settling basin of the sewage treatment plant, so that also in this case the environments are not subjected to an additional load.

By means of the inventive process for the disposal of settled sludge there can, on account of the branchings provided in the process, be adjusted, according to the problem posed, the proportion of end products suitable for fertilizing purposes or for being deposited and the proportion of end products suitable for being subjected to a combustion or a pyrolysis, respectively.

The process according to the invention is further developed in an advantageous manner if the air preheated by the waste steam of the lock is partially used for post-drying the solid matter from the centrifuge and is partially further heated by the waste heat of the combustion and is supplied as hot combustion air to the combustion of the post-dried solid matter. In this case, $CO_2$ can be extracted from the centrifuge, thus making sure an intense heating by means of steam within the centrifuge.

The exhaust air extracted from the system can in an advantageous manner be subjected to a desodorizing step. In this case, it is of particular advantage that the air being circulated for its major part within the system can be extracted from the sewage-disposal plant. In this manner any odorous annoyance accompanying, as a rule, great settling basins is substantially reduced. For this purpose, it is proposed to cool the centrifugate subsequently to the precipitation of heavy metals with part of the air extracted from the sewage-disposal plant, in particular with part of this air extracted from above the settling basin, which air is subsequently used, after having been heated by waste steam of the lock and waste heat of the combustion, as hot combustion air in the combustion step.

For reducing the emission of noxious matter when burning the post-dried solid matter discharged from the centrifuge and for also improving the energy balance in this case, the procedure is preferably such that the flue gases of the combustion are, after the second pre-heating step for the air, supplied to a flue gas purification step, in particular to a flue gas washing step and/or a wet dust separation step, noting that the wash water is, after having been neutralized, supplied to the sewage-disposal plant, in particular to its sand trap or its presettling basin. Also in this case, there results, on account of the combined use of a sewage-disposal plant as well as of a centrifuge operated under steam pressure with a combustion plant burning the product of the centrifuge operated under steam pressure, a further optimization or reduction, respectively, of the energy consumption without additional environmental load, because any wash water can again be recycled to the waste water purification stage contained in the plant.

Also the centrifugate present after separation of the heavy metals can be processed within the same plant without any environmental load, and for this purpose it is in an advantageous manner proposed to subject this centrifugate to a cooling step and subsequently to subject the cooled centrifugate either to a putrefaction step and to recycle combustible gases to the combustion step and to recycle the remaining residue to the pre-settling basin of the sewage-disposal plant or to recycle the cooled centrifugate directly to the sewage-disposal plant.

Also any wash water required for purifying the flue gases can be obtained immediately from the process itself, and for this purpose it is proposed to supply part of the clarified sewage, after having been subjected to a conditioning step, to the flue gas washing step or to the wet dust separating step of the flue gas purification means.

During such a flue gas purification step, gas components such as HCl, $Cl_2$ or $SO_2$ are simultaneously washed out. This wash water can, after having been neutralized, again be subjected to a settling step and the sludge obtained can, together with the heavy metal sludge, be dewatered and be supplied to a special depositing site or to a further utilizing step. Any clarified waste water can, after the neutralization step, be recycled into the sewage-disposal plant.

Of course, the cooled waste gases can be subjected to an additional conventional purification step in which, for example, lime and lime milk are used as a neutralization agent. Any $CaSO_3$—$CaSO_4$ formed as well as the sludge containing lime milk may partially be neutralized and be recycled to the settling plant upstream its sand trap. A certain amount of $Ca(OH)_2$ is favourable in this process, because it combines with the $CO_2$ contained in the waste water and precipitates the biological active phosphorus.

BRIEF DESCRIPTION OF THE DRAWING

In the following, the invention is further explained with reference to an embodiment of a plant suitable for performing the process, this embodiment being schematically shown in the drawing.

DETAILED DESCRIPTION OF THE PREFERRED EMBODIMENT

In the drawing, supply of raw sewage, for example of municipal or industrial sewage, is indicated by 1. In the sewage purifying plant or settling plant, respectively, pre-purification 2 is effected by means of gratings for separating coarse foreign matter such as wood lumps, rags, paper or the like. These materials can, after having been subjected to a disintegrating step 3, be supplied to the presettling basin. Subsequently, there is provided a sand trap 4, whereupon the raw sewage supply is fed into a presettling basin 5. Pre-settled sludge is removed from this presettling basin, which is indicated by 6. This presettled sludge is, together with excess sludge 7 from a supplementary settling basin 8, supplied to a thickener 9.

A biological sewage treatment is effected within an activated sludge basin 10 provided between the presettling basin 5 and the supplementary settling basin 8. Part of the water removed from the supplementary settling basin can be recycled to this activated sludge basin 10 via the conduit 11. The major part of the clarified water may be fed into the receiving stream 12.

The intermediate storage means for pre-settled sludge and excess sludge are designated by 6 and 7, respectively, and allow to supply these materials to the thickener 9 in dependence on quality and amount, so that some degree of equalization of the quality of the material is achieved which is subjected to a pre-dewatering step 13, in particular within a sieve belt press. The sludge obtained from the thickener enters, after having left the pre-dewatering stage 13, via an entry lock 14 into a centrifuge 15 which is subjected to the action of steam generating means supplied via a conduit 16. The steam generating means is designated by 17. The centrifugate from this centrifuge is discharged via a lock 18 and is immediately subsequently subjected to a precipitation of heavy metals at 19. The sulfidic precipitate of this precipitating step can be fed to a special depositing site 20 or be further processed for separating the heavy metals. The remaining centrifugate is cooled within a cooling stage 21 and subsequently subjected to a putrefaction step 22. The sewage gases thereby generated can be supplied to a combustion means 23, in particular to a fluidized bed furnace. The remaining liquid phase can be recycled to the presettling basin 5 via a conduit 24. The water separated within the mechanical pre-dewatering stage 13 can be recycled to the pre-settling basin 5 via a conduit 25.

$CO_2$ is removed from the steam centrifuge, as is indicated by 26, and this $CO_2$ can be added to the waste steam from the lock via a conduit 27. The waste steam from the locks 14 and 18 as well as from the discharge lock 28 for discharging solid matter separated within the centrifuge is collected at 29 and reused for pre-heating air at 30. The condensate formed during this pre-heating step is collected at 31 and is recycled to the presettling basin via a conduit 32. The air required for a supplementary drying step 33 as well as the air required as combustion air for the combustion step 23 is extracted via a conduit 34 above the pre-settling basin, the activated sludge basin and the supplementary settling basin, so that any odorous annoyance is eliminated within this area. This air is first used for cooling the centrifugate at 21 and arrives, after the first pre-heating stage 30 for air, at the already mentioned supplementary drying stage 33 for the solid matter discharged from the centrifuge. A further portion of this air is, after the first pre-heating stage for air, fed via a conduit 35 to a further pre-heating stage 37 for air interconnected into the waste gas or flue gas conduit 36, whereupon the air, additionally heated in this manner, is, via a conduit 38, placed at disposal for burning at least part of the solid matter discharged from the supplementary drying stage 33. A further heat exchanger 39 is interconnected into the flue gas conduit 36 and supplies the energy required for the steam generating means 17. The flue gases having passed the second preheating stage 37 for air are subjected to a wet dust removal 40 and to a flue gas washing step 41 prior to again being supplied to a heat exchanger 42 for being exhausted into atmosphere in a heated condition. The sludges extracted from the wet dust removal step 40 may be dewatered at 43 and subsequently be transported to a special depositing site 44. Part of the dewatered solid matter derived from the dewatering stage 43 can, after a neutralizing step at 45, be recycled to the sand trap 4. Clarified sewage extracted from the supplementary settling basin 8 can be used in the flue gas washing stage 41 as well as in the wet dust removal stage 40, for which purpose there is provided a conduit 46. The clarified sewage is subjected to a corresponding conditioning step 47 in dependence on the desired use prior to being utilized in the flue gas washing stage 41 or within the wet dust removal stage 40.

Of course also ash comes from the combustion stage 23 and this ash can be transported to a depositing site. This is indicated by 48.

Feed-water conditioning for the boiler is designated by 49.

Beside the possbility to burn at least part of the solid matter extracted from the post-drying stage 33, there can, in dependence on the output in solid matter and in dependence on the energy requirement of the plant, be supplied a further partial amount to an external combustion means as is indicated by 50 or be used for the production of fertilizers as is indicated by 51. When producing fertilizers, there is provided, as a rule, a prior agglomerating stage designated by 52. In dependence on the danger inherent in the remaining substances, there exists the alternate possibility to transport the solid matter to the depositing site 53.

In such a plant, the sludge discharged from the mechanical pre-dewatering stage 13 has, when using a sieve belt press, as a rule a content in dry matter of 20 to 30 percent by weight. Such a sieve belt press has the advantage to immediately yield a product which is particularly suitable for being charged into the subsequent centrifuge being operated with saturated steam at a pressure of 2 to 35 bar. In dependence on the saturated steam pressure applied, there results behind the centrifuge a content in solid matter within the range of 50 to 80 percent by weight. The content in dry matter can, if required, be further increased in a post-drying stage known per se by using warm air.

The dried sludge has a reduced content in water-soluble heavy metal compounds on account of the hydrolysis taking place during the treatment with saturated steam, so that this sludge is well suitable for being burnt to produce the steam required for the centrifuge provided within the sewage-disposal plant, with or without utilizing waste heat. On account of the mentioned separation of the heavy metals, further processing for fertilizing purposes is easily possible.

A fluidized bed combustion means is, in usual manner, preferred for burning the sludge, thereby using preheated air. When burning the dried sludge, there can be produced an amount of steam which is far in excess of the requirement of the centrifuge subjected to saturated steam and which can be used for heating the plant or even for external purposes.

In the drawing, there are shown two steam generating means, noting that one of these steam generating means can be supplied with natural gas, fuel oil or electric energy if the plant has to be put in operation.

The wet dust removal stage can in usual manner be equipped with Venturi scrubbers, thereby using purified waste gas from the settling stage. Above all, the possibility to utilize exhaust air of offensive smell of the sewage-disposal plant for the purpose of the whole plant—which can be effected by a roofing above the various basins and by sucking-off the waste air—provides a further possibility to reduce the environmental load. That portion of air which is in excess of the portion of air required as combustion air can be subjected to an absorptive purifying step using purified waste water, said desodorizing stage being designated by 54.

What is claimed is:

1. A process for the disposal of settled sludge derived from a biological sewage-disposal plant, of the kind in which the thickened sludge is further dewatered and is at least partially decomposed within a centrifuge by using saturated steam, preferably at a pressure within the range of 1 to 15 bar and at a temperature of 100° C. to 200° C., the improvement comprising discharging the centrifugate of the centrifuge via a lock and immediately subsequently subjecting the centrifugate to a sulfidic precipitation of heavy metals, discharging the solid matter separated within the centrifuge via locks, subjecting said solid matter at least partially to a combustion step for steam production for the centrifuge, recycling the steam within a closed circuit, and utilizing waste steam from the locks for air-heating, whereupon the condensate thus formed is supplied to a preliminary settling basin of the sewage-disposal plant.

2. Process as claimed in claim 1, characterized in that the air preheated by the waste steam of the locks is partially used for post-drying (33) the solid matter from the centrifuge (15) and is partially further heated by the waste heat of the combustion (37) and is supplied as hot combustion air to the combustion (23) of the post-dried solid matter.

3. Process as claimed in claim 1 or 2, characterized in that $CO_2$ is removed from the centrifuge (15).

4. Process as claimed in any one of claims 1, 2 or 3, characterized in that the exhaust air is subjected to a desodorizing step (54).

5. Process as claimed in any one of claims 1 to 4, characterized in that the flue gases of the combustion are, after the second pre-heating step (37) for the air, supplied to a flue gas purification stage, in particular to a flue gas washing stage (41) and/or a wet dust separation stage (40), noting that the wash water is, after having been neutralized (45), supplied to the sewage-disposal plant, in particular to its sand trap (4) or its pre-settling basin (5).

6. Process as claimed in any one of claims 1 to 5, characterized in that the centrifugate is, after the separation stage (19) for heavy metals and after a cooling stage (21), either subjected to a putrefaction step (22), thereby recycling combustible gases to the combustion stage (23) and recycling the remaining residue to the pre-settling basin (5), or directly recycled to the sewage-disposal plant.

7. Process as claimed in any one of claims 1 to 6, characterized in that cooling (21) of the centrifugate as present after the precipitation step (19) for heavy metals is effected with the air extracted from the sewage-disposal plant, in particular from above the settling basins (5, 8, 10), said air being subsequently used as hot combustion air when having been heated by the waste steam of the locks and by the waste heat of the combustion.

8. Process as claimed in any one of claims 1 to 7, characterized in that part of clarified waste water is, after having been subjected to a conditioning step (47), supplied to the flue gas washing stage (41) and the wet dust removal means (40), respectively, for the purpose of purifying the flue gases.

9. A process comprising treating settled sludge derived from a biological sewage disposal plant and containing heavy metal components by the steps of:
mechanically dewatering the settled sludge to obtain wet thickened sludge;
treating the thickened sludge in a centrifuge with saturated steam at a pressure in the range 1 to 15 bar and at a temperature of 100° C. to 200° C. in order to further dewater the sludge and to effect chemical conversions and decompositions within the sludge;
discharging the resulting dewatered sludge via a lock from the centrifuge;
discharging hot liquid centrifugate via a lock from the centrifuge;
immediately adding at least one soluble sulfide to the hot centrifuge at a temperature of about 90° C. to thereby precipitate heavy metal sulfides; and separating the precipitate from the remaining centrifugate.

10. A process as in claim 9 including further drying the sludge discharged from the centrifuge, burning at least a portion of the further dried sludge and generating steam with the heat thus produced and feeding such steam to the centrifuge.

11. A process as in claim 10 including obtaining waste steam from the locks, heating air with the waste steam in a heat exchanger thereby obtaining steam condensate, using the thus heated air to dry the sludge in said further drying step, and feeding said condensate to a settling basin from which the initial settled sludge is obtained.

* * * * *